United States Patent [19]
Yamazaki et al.

[11] Patent Number: 5,352,880
[45] Date of Patent: Oct. 4, 1994

[54] OPTICAL CARD HAVING A MIRROR SECTION WITH A PAIR OF AUXILIARY GUIDE TRACKS

[75] Inventors: Koichi Yamazaki, Sakado; Kazuo Noda, Yokohama, both of Japan

[73] Assignee: Murata Kikai Kabushiki Kaisha, Kyoto, Japan

[21] Appl. No.: 74,778

[22] Filed: Jun. 10, 1993

[30] Foreign Application Priority Data

Jun. 24, 1992 [JP] Japan ................................ 4-166105

[51] Int. Cl.⁵ ............................................. G06K 19/06
[52] U.S. Cl. .................................... 235/494; 235/454; 369/44.26; 369/275.1; 369/275.3
[58] Field of Search .......................... 235/454, 494; 369/44.26, 111, 275.1, 275.3

[56] References Cited

U.S. PATENT DOCUMENTS 4,885,736 12/1989 Horie ................................ 369/275.1

FOREIGN PATENT DOCUMENTS 59-193556 11/1984 Japan .
58-193557 11/1984 Japan .
59-193558 11/1984 Japan .
2174530 11/1986 United Kingdom .

Primary Examiner—Donald Hajec
Assistant Examiner—Adrian Young
Attorney, Agent, or Firm—Spensley Horn Jubas & Lubitz

[57] ABSTRACT

The present invention provides an optical card wherein the irradiation position of laser beams is pulled back into an information recording section 1 in such a manner that the operation of recording or reproducing information can continue. In this optical card, information is recorded on or reproduced from a prescribed information recording section on a card surface in accordance with optical scanning along guide tracks provided in the card surface, and the optical card is provided with a mirror section arranged adjacent to the information recording section in the direction parallel to the direction of optical scanning of the information recording section. The optical card is characterized in that the mirror section is provided with at least one pair of curved auxiliary guide tracks that are connected to the guide tracks in the information recording section.

3 Claims, 2 Drawing Sheets

OPTICAL CARD HAVING A MIRROR SECTION WITH A PAIR OF AUXILIARY GUIDE TRACKS

BACKGROUND OF THE INVENTION

1. Industrial Application of the Present Invention

The present invention relates to an information recording medium formed in a card shape (hereinafter simply called an optical card) wherein information is recorded on and reproduced from a prescribed track in accordance with optical scanning, and, in particular, to an optical card wherein an access operation to a desired track can be performed reliably when information is to be recorded or reproduced.

2. Prior Art

A conventional optical card records information in a prescribed rectangular region of longitudinal dimension L and vertical dimension W on one surface of a card of the same external dimensions as those of a credit card, as shown by way of example in FIG. 4.

This region is provided with an information recording section 1 in the center, with preformatting sections 2 and 3 to left and right and mirror sections 4 and 5 above and below the information recording section 1.

The information recording section 1 and the preformatting sections 2 and 3 are, as shown in FIG. 5, formed of guide tracks 6 that are, for example, 2.5-μm wide at a pitch of 12 μm. These guide tracks 6 have an optical reflectivity that is less than that of other sections of the card. Information tracks 9 of a width of 9.5 μm are provided sandwiched between the guide tracks 6.

To record information onto an information track 9, the information is recorded by irradiating a laser beam onto an information track region 7 provided along the center of the information track 9 to form information pits 8 therein, while the optical card is being moved parallel to the guide tracks 6. To reproduce recorded information, a laser beam is irradiated onto the information track 9 which comprises a string of information pits 8, and the strength of the light reflected back therefrom is reproduced as information. The information pits 8 have an optical reflectivity less than that of other parts of the optical card, and thus the strength of the light reflected back therefrom is weaker, and the information can be reproduced as differences in this strength.

The preformatting sections 2 and 3 are provided at either end of the information recording section 1 in the scanning direction and contain previously recorded address information. The mirror sections 4 and 5 are provided on either side of the information recording section 1, parallel to the scanning direction. These mirror sections 4 and 5 are provided in order to protect the guide tracks 6 of the information recording section 1.

When information is recorded on the optical card configured in this manner, or reproduced therefrom, a laser beam must be irradiated onto the information tracks 9, so tracking is necessary to ensure that it does not deviate from the information tracks 9.

Tracking is done by a method such as a push-pull method or a three-beam method. With the push-pull method, as shown in FIG. 6(a), a main beam 10 of a pair of laser beams is irradiated onto an information track 9 and a secondary beam 11 is irradiated onto the center of a guide track 6, the distribution of strength across the width of the resultant reflected beam is detected, and the system is controlled in such a manner that the strength distribution is kept symmetrical in the direction perpendicular to the guide track 6 to ensure that the secondary beam 11 does not deviate from the center of the guide track 6. This also controls the main beam 10 in such a manner that it does not deviate from the information track 9.

In the three-beam method illustrated in FIG. 6(b), a main beam 10 is irradiated onto the information track 9 and half each of two secondary beams 11a and 11b is irradiated onto adjoining guide tracks 6a and 6b. Control is such that the difference in strength of the light reflected back by the secondary beams is made to be zero, and thus the linked main beam 10 is controlled in such a manner that it does not deviate from the information track 9.

These conventional methods of tracking use the guide tracks 6 as reference. Therefore, if there are no guide tracks 6, the positions at which the laser beams (the main beam 10 and the secondary beam(s) 11) irradiate cannot be controlled, and thus the laser beams will irradiate an undesirable area.

Problem to be Solved by the Present Invention

If an error should occur during the operation of recording information onto an optical card or reproducing it therefrom, such as if the laser beams should jump from the irradiation position and an attempt is made to access a desired information track close to the mirror section 4 of the information recording section 1, the irradiation position of the laser beams could overshoot the information recording section 1 and encroach on the mirror section 4.

Since the irradiation position of the laser beams cannot be controlled in places where there are none of the guide tracks 6 described above, once the laser beam enters the mirror section 4 where there are no guide tracks 6, the problem occurs that it is no longer possible to pull the laser beam back into the information recording section, and thus it is no longer possible to record or reproduce information.

SUMMARY OF THE INVENTION

The present invention was devised in order to solve the above problem and has as its objective the provision of an optical card wherein the irradiation position of a laser beam can be pulled back into the information recording section 1 in such a manner that the operation of recording or reproducing information can continue.

Means of Solving the Above Problem

In order to achieve the above object, the present invention provides an optical card wherein information is recorded on or reproduced from a prescribed region on a card surface in accordance with optical scanning along guide tracks provided in the card surface, and the optical card is provided with a mirror section arranged adjacent to the prescribed region in the direction parallel to the direction of optical scanning of the prescribed region. The optical card is characterized in that the mirror section is provided with at least one pair of curved auxiliary guide tracks that are connected to the guide tracks in the prescribed region.

The auxiliary guide tracks are provided in the mirror section, but they are arranged in such a manner that end portions thereof curve so as to connect with the guide tracks in the information recording section.

Therefore, if the laser beam should cross the guide track and enter the mirror section, the auxiliary guide track will detect it in the same way as the guide track would, and it will track along the auxiliary guide track. As the laser beam tracks along the auxiliary guide track, it reaches the guide tracks in the prescribed area, and thus the tracking returns to the prescribed area.

Effect of the Present Invention

As described above, since the optical card of the present invention is provided with auxiliary guide tracks connected to guide tracks for the information recording section in the mirror section that is provided adjacent to the information recording section of the optical card, if the laser beams should encroach on the mirror section, they will be able to follow the auxiliary guide tracks until they reach the guide tracks in the information recording section. Therefore, a large movement such as a track jump will no longer make tracking control impossible, and thus the recording and reproduction of information on the optical card can be performed smoothly.

PREFERRED EMBODIMENTS OF THE PRESENT INVENTION

Figure 1:
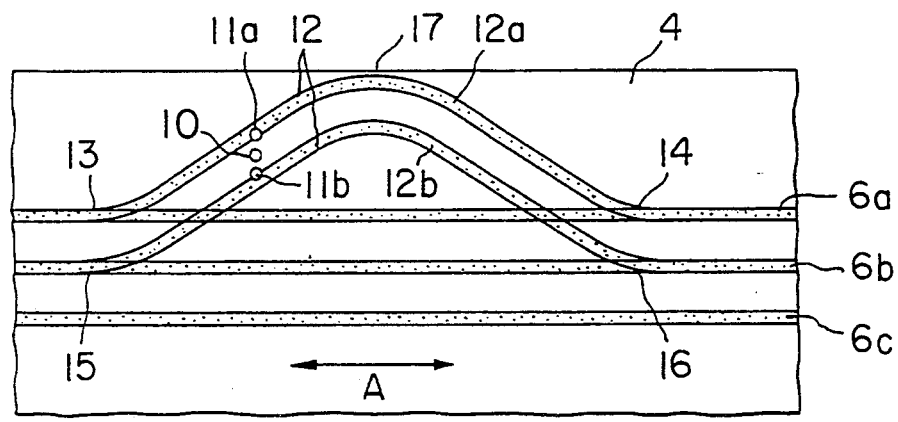
FIG. 1 is a view of one embodiment of the present invention.

The configuration of one embodiment of the present invention is shown in FIG. 1, illustrating parts of an information recording section and a mirror section of a optical card. As shown in the figure, the information recording section is provided with guide tracks 6a, 6b, and 6c. A pair of auxiliary guide tracks 12a and 12b that curve away from two these guide tracks 6a and 6b in unison, but are connected thereto, are provided in the mirror section 4.

The auxiliary guide track 12a is connected to the guide track 6a at connection points 13 and 14, and the auxiliary guide track 12b is connected to the guide track 6b at connection points 15 and 16. The auxiliary guide tracks 12a and 12b are provided in such a manner that the portions thereof between connection point 13 or 14 and connection point 15 or 16 curve so as to come close to an edge portion 17 of the mirror section 4.

The optical card moves in a reciprocal motion in the direction of the arrows A to enable the recording or reproduction of information. If a track jump should cause the irradiation position of the laser beams (the main beam 10 and the secondary beam(s) 11) to invade the mirror section 4 while the optical card is moving in this reciprocal motion, the reciprocation of the optical card will make the laser beam irradiate one of the auxiliary guide tracks 12.

When the laser beam irradiates the auxiliary guide track 12, it is made to track the auxiliary guide track 12 by a detection device that is not shown in the figures, and tracking continues until it reaches the connection point 13 or 15 or the connection point 14 or 16. The laser beam subsequently tracks along the guide track 6.

Figure 2:
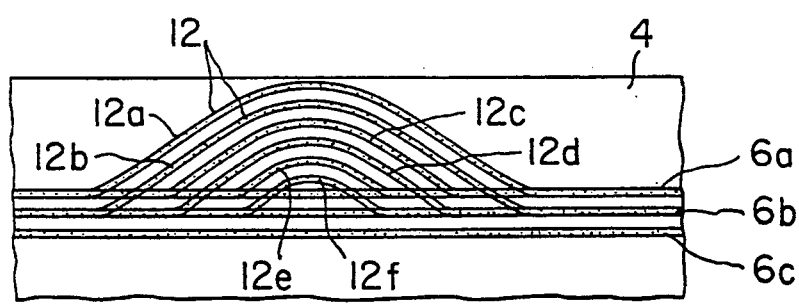
FIG. 2 is a view of a second embodiment of the present invention.

A second embodiment of the present invention is shown in FIG. 2. In this embodiment, three pairs of auxiliary guide tracks 12a and 12b, 12c and 12d, and 12e and 12f are provided in such a manner that they are centered at the same positions in the direction perpendicular to the scanning direction. These three pairs of guide tracks protrude into the mirror section 4 by different amounts, so that the pair of guide tracks that protrudes most has the greatest distance between the connection points thereof and the pair that protrudes least has the shortest distance between the connection points thereof.

Therefore, if the auxiliary guide tracks 12a and 12b are detected, the return to the guide track 6 will take a while; but if the auxiliary guide tracks 12e and 12f are detected, the return to the guide track 6 will be quick.

Note that, the more auxiliary guide tracks are provided, the higher the probability that the laser beams will be pulled back, and thus the laser beams can be pulled back to the guide tracks more satisfactorily.

Figure 3:
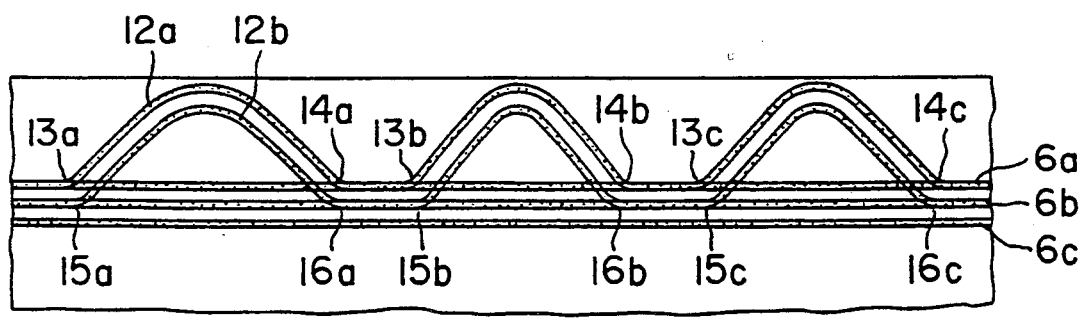
FIG. 3 is a view of a third embodiment of the present invention.
Figure 4:
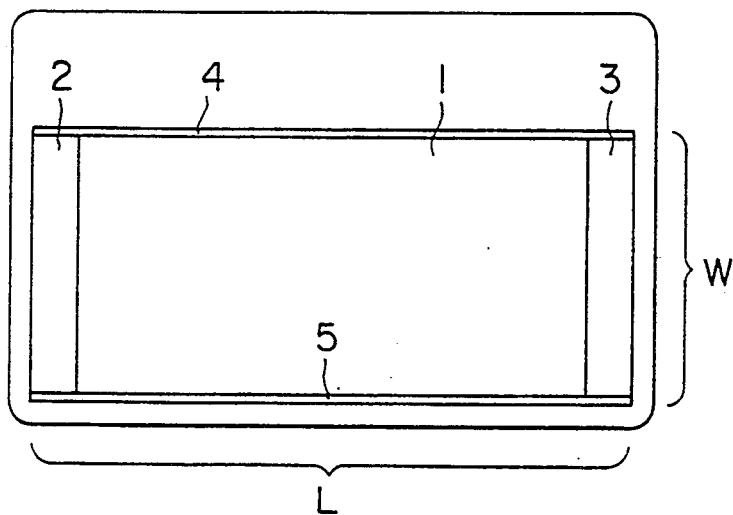
FIG. 4 is a view of the entire configuration of a conventional optical card.
Figure 5:
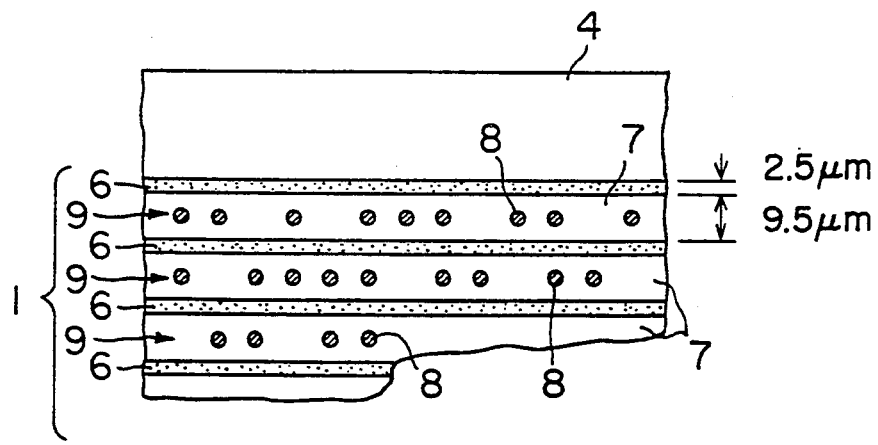
FIG. 5 shows the guide tracks and information pits of the optical card of FIG. 4, and FIG. 6(a), (b) show relationships between guide tracks and information tracks.
Figure 6:
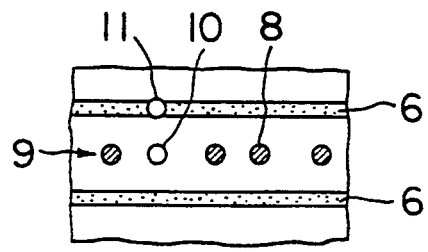
Figure 6:
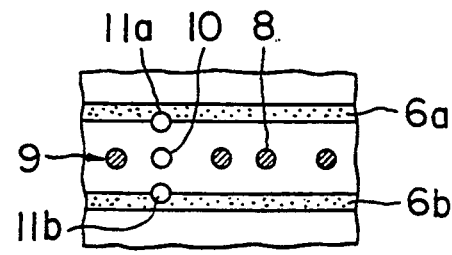

A third embodiment of the present invention is shown in FIG. 3. In this embodiment, pairs of auxiliary guide tracks are provided at three locations along the scanning direction of the optical card. These pairs of auxiliary guide tracks all protrude to the same degree.

With this configuration, if the laser beams should deviate from the guide tracks at any of various positions along the scanning directions, they can be pulled back to the guide tracks.

What is claimed is:

1. An optical card wherein information is recorded on or reproduced from a prescribed region on a card surface in accordance with optical scanning along guide tracks provided in said card surface, and wherein said optical card is provided with a mirror section arranged adjacent to said prescribed region in the direction parallel to said direction of said optical scanning of said prescribed region, said optical card being characterized in that:

said mirror section is provided with at least one pair of curved auxiliary guide tracks that are connected to said guide tracks in said prescribed region.

2. An optical card in accordance with claim 1, wherein a plurality of said pairs of auxiliary guide tracks are provided at positions that are separated in a direction perpendicular to said scanning direction.

3. An optical card in accordance with claim 1, wherein a plurality of said pairs of auxiliary guide tracks are provided at positions that are separated in said scanning direction.

* * * * *

UNITED STATES PATENT AND TRADEMARK OFFICE
CERTIFICATE OF CORRECTION

PATENT NO. : 5,352,880
DATED : October 4, 1994
INVENTOR(S) : Koichi Yamazaki, et al.

It is certified that error appears in the above-indentified patent and that said Letters Patent is hereby corrected as shown below:

On the title page, item [73]:
   After "Assignee:", delete "Murata Kikai Kabushiki Kaisha, Kyoto", and substitute therefor Nippon Conlux Co., Ltd., Tokyo.

Signed and Sealed this

Sixteenth Day of May, 1995

Attest:

BRUCE LEHMAN

*Attesting Officer*           *Commissioner of Patents and Trademarks*